United States Patent
Deforge et al.

(10) Patent No.: US 11,312,072 B2
(45) Date of Patent: Apr. 26, 2022

(54) BLADE CHANGERS FOR ADDITIVE MANUFACTURING SYSTEMS AND METHODS OF INTERCHANGING RE-COATER BLADES IN ADDITIVE MANUFACTURING SYSTEMS

(71) Applicant: Hamilton Sundstrand Corporation, Charlotte, NC (US)

(72) Inventors: Jasen Deforge, West Hartland, CT (US); Shawn Karl Reynolds, Byron, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 51 days.

(21) Appl. No.: 16/527,699

(22) Filed: Jul. 31, 2019

(65) Prior Publication Data
US 2021/0031447 A1    Feb. 4, 2021

(51) Int. Cl.
| | |
|---|---|
| *B29C 64/214* | (2017.01) |
| *B29C 64/264* | (2017.01) |
| *B29C 64/153* | (2017.01) |
| *B29C 64/245* | (2017.01) |
| *B29C 64/371* | (2017.01) |
| *B33Y 10/00* | (2015.01) |

(Continued)

(52) U.S. Cl.
CPC .......... *B29C 64/214* (2017.08); *B29C 64/153* (2017.08); *B29C 64/245* (2017.08); *B29C 64/264* (2017.08); *B29C 64/371* (2017.08); *B33Y 10/00* (2014.12); *B33Y 30/00* (2014.12); *B33Y 40/00* (2014.12); *B33Y 80/00* (2014.12)

(58) Field of Classification Search
CPC ... B26C 64/214; B26C 64/264; B26C 64/245; B26C 64/371; B33Y 30/00; B33Y 40/00; B41F 9/109; B64C 11/04
See application file for complete search history.

(56) References Cited

U.S. PATENT DOCUMENTS 7,850,885 B2 * 12/2010 Philippi ................. B33Y 40/00
264/113
10,105,758 B2    10/2018 Aydin et al.
(Continued)

FOREIGN PATENT DOCUMENTS

CN    105172145 A    12/2015
CN    109454870 A    3/2019
(Continued)

OTHER PUBLICATIONS

Patent Translate, "Description CN111267344A", Mar. 5, 2021, EPO and Google. (Year: 2021).*
(Continued)

*Primary Examiner* — Joseph S Del Sole
*Assistant Examiner* — Margaret B Hayes
(74) *Attorney, Agent, or Firm* — Cantor Colburn LLP

(57) ABSTRACT

A blade changer includes a housing with a port, a magazine supported within the housing, and a manipulator. The manipulator is operably associated with the magazine and has a reach extending beyond the port to interchange re-coater blades between the magazine and an additive manufacturing system coupled to the port. Additive manufacturing systems and methods of interchanging a deployed re-coater blade with a staged re-coater blade are also described.

16 Claims, 10 Drawing Sheets

(51) Int. Cl.
  *B33Y 30/00* (2015.01)
  *B33Y 40/00* (2020.01)
  *B33Y 80/00* (2015.01)

(56) References Cited

U.S. PATENT DOCUMENTS

| | | | | |
|---|---|---|---|---|
| 2006/0156978 | A1* | 7/2006 | Lipson | B33Y 30/00 438/3 |
| 2006/0178775 | A1* | 8/2006 | Zhang | B25J 9/0081 700/245 |
| 2007/0074659 | A1* | 4/2007 | Wahlstrom | B29C 64/135 118/712 |
| 2014/0077422 | A1* | 3/2014 | Minick | B22F 12/00 264/497 |
| 2016/0121397 | A1* | 5/2016 | Aydin | B05C 19/00 118/708 |
| 2016/0151840 | A1* | 6/2016 | McCoy | B29C 64/205 425/78 |
| 2017/0069517 | A1* | 3/2017 | Goto | H01L 21/67778 |
| 2018/0200791 | A1* | 7/2018 | Redding | B22F 10/20 |
| 2018/0200964 | A1 | 7/2018 | Rockstroh et al. | |
| 2018/0236549 | A1* | 8/2018 | Spears | B22F 10/20 |
| 2020/0376762 | A1* | 12/2020 | Sweetland | B29C 64/214 |

FOREIGN PATENT DOCUMENTS

| | | | |
|---|---|---|---|
| DE | 102012012412 | A1 | 3/2014 |
| DE | 102015107178 | A1 | 11/2016 |
| DE | 102015107179 | A1 | 11/2016 |

OTHER PUBLICATIONS

Merriam-Webster (Merriam-Webster, "Remotely", Aug. 25, 2021. (Year: 2021).*
English Abstractor of DE 102015107178A1, 2 pages.
English Abstract of DE102012012412A1, 2 pages.
English Abstract of DE102015107179A1, 3 pages.
Extended European Search Report for International Application No. 19215292.4 dated May 26, 2020, 6 pages.

* cited by examiner

BLADE CHANGERS FOR ADDITIVE MANUFACTURING SYSTEMS AND METHODS OF INTERCHANGING RE-COATER BLADES IN ADDITIVE MANUFACTURING SYSTEMS

BACKGROUND

The present disclose is generally related to additive manufacturing, and more particularly to interchanging re-coater blades in additive manufacturing systems.

Additive manufacturing techniques, such as powder bed fusion and selective laser sintering, are commonly used to fabricate articles by fusing powder with an energy beam. Fabrication of articles using such techniques generally entails coating a build platform with powder, fusing a portion of the powder to form a layer of the article, and thereafter re-coating the build platform and the article with additional powder to form a successive layer by fusing a portion of the additional powder. A re-coater device is typically employed to coat the build platform and article between successive fusing operations.

Re-coater devices typically employ a blade structure to mechanically manipulate powder in additive manufacturing systems. In some additive manufacturing systems the blade structure can periodically require replacement, such as from wear and/or damage sustained while manipulating powder in the system. When replacement of the blade is required the build process is typically interrupted such that a user can access the re-coater device and replace the blade structure. During the interruption the additive manufacturing system is generally unavailable for production, the environment within the additive manufacturing system may be breached, and/or it may be necessary to scrap the article undergoing build at the time of the interrupt event.

Such systems and methods have generally been satisfactory for their intended purpose. However, there remains a need for improved additive manufacturing systems and methods of making articles using additive manufacturing techniques.

BRIEF DESCRIPTION

A blade changer is provided. The blade changer includes a housing with a port, a magazine supported within the housing, and a manipulator. The manipulator is operably associated with the magazine and having a reach extending beyond the port to interchange re-coater blades between the magazine and an additive manufacturing system coupled to the port.

In addition to one or more of the features described above, or as an alternative, further embodiments of the blade changer may include that the magazine includes two or more blade supports fixed to the magazine.

In addition to one or more of the features described above, or as an alternative, further embodiments of the blade changer may include two or more re-coater blades supported by the magazine.

In addition to one or more of the features described above, or as an alternative, further embodiments of the blade changer may include that the two or more re-coater blades includes a re-coater blade of a first type and a re-coater blade of a second type, wherein the second type is different than the first type.

In addition to one or more of the features described above, or as an alternative, further embodiments of the blade changer may include that one or more of the re-coater blades is worn or damaged.

In addition to one or more of the features described above, or as an alternative, further embodiments of the blade changer may include that the magazine has a drum and that the drum supports the two or more re-coater blades.

In addition to one or more of the features described above, or as an alternative, further embodiments of the blade changer may include that the magazine includes a chain-turret, and that the chain-turret supports the two or more re-coater blades.

In addition to one or more of the features described above, or as an alternative, further embodiments of the blade changer may include that the manipulator is arranged within the housing of the blade changer.

In addition to one or more of the features described above, or as an alternative, further embodiments of the blade changer may include a controller operably connected to the blade changer and responsive to instructions recorded on a non-transitory machine-readable medium to (a) retrieve a deployed re-coater blade from a blade seat of a re-coater, (b) stage the deployed re-coater blade in the magazine, (c) select a staged re-coater blade from the magazine, and (d) deploy the staged re-coater blade to the blade seat of the re-coater.

An additive manufacturing system is also provided. The additive manufacturing system includes a build chamber having an interior and a pass-through, and a blade changer as described above. The housing of the blade changer is coupled to the build chamber such that the pass-through is in communication with the port. The re-coater is arranged within the housing and the reach of the manipulator extends between the magazine and the re-coater for interchange of a re-coater blade carried by the re-coater and a re-coater blade supported by the magazine.

In addition to one or more of the features described above, or as an alternative, further embodiments of the additive manufacturing system may include that the magazine has two or more blade supports fixed to the magazine and that the manipulator is arranged within the housing of the blade changer.

In addition to one or more of the features described above, or as an alternative, further embodiments of the additive manufacturing system may include an energy source with an emitter and a scanner, the energy source optically coupled to the scanner, and the scanner optically coupled to an interior of the build chamber.

In addition to one or more of the features described above, or as an alternative, further embodiments of the additive manufacturing system may include a build platform arranged within the interior of the build chamber, and an article having a plurality of layers formed from interfused powder, the article supported by the build platform.

In addition to one or more of the features described above, or as an alternative, further embodiments of the additive manufacturing system may include a shutter disposed within the pass-through.

In addition to one or more of the features described above, or as an alternative, further embodiments of the additive manufacturing system may include that the shutter has an open position and a closed position, that the interior of the build chamber is in communication with the housing of the blade changer in the open position, and that the interior of the build chamber is separated from the housing of the blade changer in the closed position.

In addition to one or more of the features described above, or as an alternative, further embodiments of the additive manufacturing system may include that the interior of the build chamber has a chamber inert atmosphere, the housing of the blade changer contains a blade changer inert atmosphere, and that the system additionally includes a wear sensor in communication with the re-coater for monitoring wear and/or damage of the re-coater blade.

A method of interchanging a deployed re-coater blade with a staged re-coater blade is additionally provided. The method includes, at a blade changer as described above, (a) retrieving a deployed re-coater blade from a blade seat of a re-coater, (b) staging the deployed re-coater blade in the magazine, (c) selecting a staged re-coater blade from the magazine, and (d) deploying the staged re-coater blade to the blade seat of the re-coater.

In addition to one or more of the features described above, or as an alternative, further embodiments of the method may include that the staged re-coater blade and the deployed re-coater blade are of the same re-coater blade type.

In addition to one or more of the features described above, or as an alternative, further embodiments of the method may include that the staged re-coater blade and the deployed re-coater blade are of different re-coater blade types.

In addition to one or more of the features described above, or as an alternative, further embodiments of the method may include opening a shutter separating the blade changer from an additive manufacturing system, wherein both the staged re-coater blade and the deployed re-coater blade remain within an inert atmosphere during the interchange.

Technical effects of the present disclosure include the capability to replace coating members on re-coaters in additive manufacturing systems. In certain embodiments coating members can be replaced automatically, limiting (or eliminating entirely) the interval during which the build of an additively manufactured article is interrupted. In accordance with certain embodiments coating members can be replaced according to coating member wear and/or in the event of coating member damage. It is also contemplated that the coating members can be replaced to vary the physical properties of an article formed using an additive manufacturing technique, such as changing the density of the powder coating to modulate surface roughness or density of a portion of the additively manufactured article.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
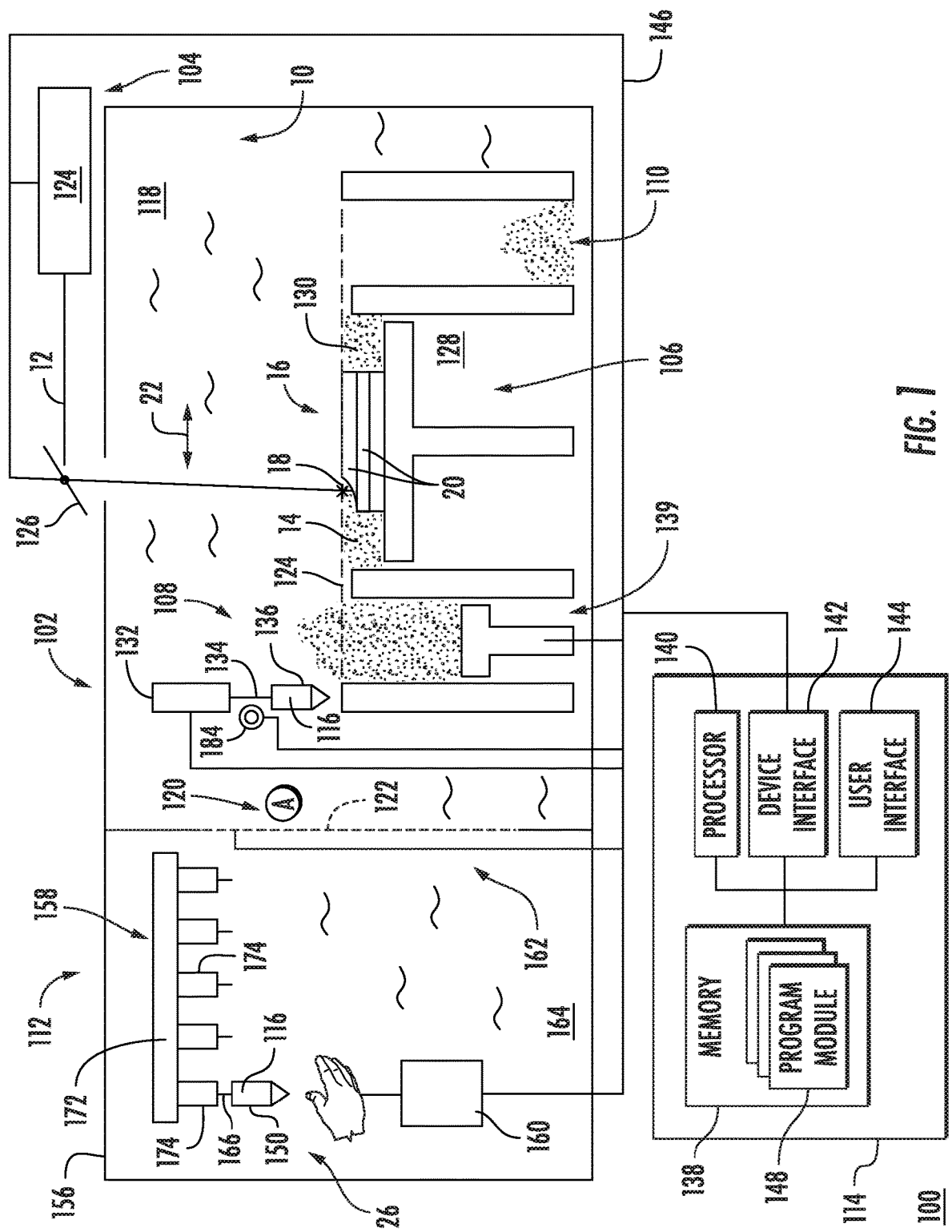
FIG. 1 is a schematic view of an additive manufacturing system constructed in accordance with the present disclosure, showing a re-coater carrying a deployed re-coater blade and a blade changer with a magazine supporting a staged re-coater blade for interchange with the deployed re-coater blade.

Reference will now be made to the drawings wherein like reference numerals identify similar structural features or aspects of the subject disclosure. For purposes of explanation and illustration, and not limitation, a partial view of an exemplary embodiment of an additive manufacturing system in accordance with the disclosure is shown in FIG. 1 and is designated generally by reference character 100. Other embodiments of additive manufacturing systems and methods of making articles using additive manufacturing techniques in accordance with the present disclosure, or aspects thereof, are provided in FIGS. 2-10, as will be described. The systems and methods described herein can be used for replacing worn or damaged re-coater members, or interchanging of coating members of different types during the build process, such as in laser-type powder bed fusion systems, though the present disclosure is not limited to any particular type of additive manufacturing system or specific need for coating member interchange in general.

Referring to FIG. 1, the additive manufacturing system 100 is shown. The additive manufacturing system 100 includes a build chamber 102, an energy source 104, and build platform 106. The additive manufacturing system 100 also includes a re-coater 108, a powder dump 110, and a blade changer 112. The additive manufacturing system 100 additionally includes a controller 114 and a plurality of re-coater blades 116.

The build chamber 102 has an interior 118, a pass-through 120, and a shutter 122. The build platform 106, the re-coater 108, and the powder dump 110 are located within the interior 118 of the build chamber 102. The shutter 122 is disposed within the pass-through 120, separates the blade changer 112 from the build chamber 102, and is arranged to provide selective communication between the blade changer 112 and the build chamber 102. In this respect the shutter 122 is movable between a closed position A and an open position B (shown in FIG. 2). It is contemplated that the interior 118 contain a chamber inert atmosphere 10, such a nitrogen and/or an argon atmosphere by way of non-limiting example.

The energy source 104 is located external of the build chamber 102 and includes an emitter 124 and a scanner 126. The emitter 124 is configured to emit electromagnetic radiation 12 suitable for fusing 18 a powder 14 and is optically coupled to the scanner 126. The scanner 126 is in turn optically coupled to the interior 118 of the build chamber 102 and is configured for directing the electromagnetic radiation 12 emitted by the energy source 104 across the build platform 106. More specifically, the scanner 126 is configured to direct the electromagnetic radiation 12 across a portion of the powder 14 coating an article 16 disposed on the build platform 106 and/or the build platform 106, fusing 18 a portion of the powder 14, and forming a plurality of layers 20 of the article 16. It is contemplated that the energy source 104 include a laser or an electron beam generator, as suitable for an intended application.

It is contemplated that the powder 14 can include a metallic material. It is also contemplated that the powder 14 can include a ceramic material or a polymeric material, as suitable for an intended application.

The build platform 106 is disposed within the interior 118 of the build chamber 102, within a silo 128, and includes a build surface 130. The build surface 130 is arranged to support the article 16 during build as the powder 14 is selectively fused to successive layers 20 of the article 16. In this respect the build platform 106 is arranged to be withdrawn into the silo 128 (downward relative to the top of FIG. 1) during the build of the article 16.

The re-coater 108 and the powder dump 110 are each adjacent to the build platform 106 on laterally opposite sides of the re-coater 108. The re-coater 108 includes a drive 132, a blade seat 134, and a deployed re-coater blade 136. The deployed re-coater blade 136 is removably fixed to the blade seat 134 and in this respect is deployed to the re-coater 108. The blade seat 134, and thereby the deployed re-coater blade 136, are operably associated with the drive 132. The drive 132 is in turn operably connected to the blade seat 134, and therethrough with the deployed re-coater blade 136, for coating the build platform 106 and the article 16 a portion of the powder 14. In this respect the drive 132 is configured to drive (e.g., reciprocation 22) the deployed re-coater blade 136 across a powder reservoir 139, the build platform 106, and the article 16 across a coating plane 24 in the direction of the powder dump 110 for coating the build platform 106 and the article 16 with a portion of the powder 14. Residual powder is deposited powder at the end of travel of the re-coater 108 in the powder dump 110.

A wear sensor 184 is positioned in proximity to the re-coater 108. The wear sensor 184 is configured for monitoring the deployed re-coater blade 136 for wear and/or damage. In this respect wear sensor 184 is configured to provide to the controller 114 a signal indicative or wear and/or damage in the event that wear and/or damage is sustained by the deployed re-coater blade 108, e.g., the wear or damage 28 (shown in FIG. 2), thereby triggering (or scheduling) an automatic interchange of the deployed re-coater blade 136 with the staged re-coater blade 150.

The controller 114 is operable connected to the blade changer 112 and the additive manufacturing system 100. In this respect the controller 114 includes a memory 138, a processor 140, a device interface 142, and a user interface 144. The processor 140 is connected to the device interface 142, and is disposed in communication therethrough with the blade changer 112, the re-coater 108, and the build platform 106 through a link 146. The processor 140 is also operably connected to the user interface 144, is disposed in communication with the wear sensor 184, and is disposed in communication with the memory 138. The memory 138 includes a non-transitory machine-readable medium having a plurality of program modules 148 recorded thereon including instructions that, when read by the processor 140, cause the processor to execute certain operations. Among those operations are the steps of a method 200 (shown in FIG. 10) of a interchanging a deployed re-coater blade with a staged re-coater blade, as will be described.

As will be appreciated by those of skill in the art in view of the present disclosure, it can be necessary to interchange the deployed re-coater blade carried by the re-coater, e.g., the deployed re-coater blade 136, with a staged re-coater blade of the same type, e.g., the staged re-coater blade 150. Interchange can be necessary, for example, to replace a worn or damaged, e.g., a worn or damaged re-coater blade 137 (shown in FIG. 2) having a damaged portion 28 (shown in FIG. 2), resultant from the reciprocation 22 of a re-coater blade. Interchange can also be necessary due to a change in the characteristics of the powder coating during the build of the article 16, for example, when the build process requires changeover between re-coater blade types, between a deployed flexible-type re-coater blade 170 and a staged roller-type re-coater blade 152. To enable such re-coater interchanges the additive manufacturing system 100 includes the blade changer 112.

The blade changer 112 includes a housing 156, a magazine 158, and a manipulator 160. The housing 156 has a port 162 and an interior 164, and is arranged for fixation to the build chamber 102 such that the port 162 communicates with the pass-through 120. In certain embodiments the interior 164 can be occupied by an inert atmosphere contain a changer inert atmosphere 26, e.g., a nitrogen and/or argon atmosphere. In accordance with certain embodiments, the changer inert atmosphere 26 can have a composition similar (or identical) to that of the chamber inert atmosphere 10 contained within the interior 118 of the build chamber 102. As will be appreciated by those of skill in the art in view of the present disclosure, the housing 156 limits (or eliminates entirely) the need to break the inert gas environment, e.g., the chamber inert atmosphere 10, within the build chamber 102 during interchange of the re-coater blade 136 and the re-coater blade 150.

The magazine 158 is arranged within the interior 164 of the housing 156 and has a plurality of re-coater blade supports 166. Each re-coater blade support 166 is configured to support a re-coater blade, e.g., the staged re-coater blade 150. As shown in FIG. 1 the staged re-coater blade 150 is of the same type as the deployed re-coater blade 136, the blade changer 112 thereby providing the capability for replacement of the deployed re-coater blade 136 in the event of unacceptable wear and/or damage during service. As will be appreciated by those of skill in the art in view of the present disclosure, the magazine 158 can alternatively (or additionally) support a re-coater blade of a different type, e.g., the roller-type re-coater blade 152 (shown in FIG. 6) and/or the brush-type re-coater blade 178 (shown in FIG. 6), the blade changer 112 thereby changing over the re-coater 108 the re-coater blade type deployed to the re-coater 108 and enabling the additive manufacturing system 100 to utilize more than one re-coater geometry and thereby to impart different material properties into selected the layers 20 of the article 16.

In certain embodiments the magazine 158 can include a drum 172. The drum 172 is arranged to support a plurality of re-coater blades, e.g., two or more of the roller-type re-coater blade 152 (shown in FIG. 6) and/or the brush-type re-coater blade 178 (shown in FIG. 6). Employment of the drum 172 allows the blade changer 112 to be readily "upgraded" to accommodate new additive manufacturing technologies by replacing the drum 172 with a drum mounting a difference re-coater blade set. Employment of the drum 172 also enables tracking the blade currently being used in the additive manufacturing system, e.g., by a blade changer-mounted sensor. Employment of the drum 172 additionally simplifies set of the additive manufacturing system, e.g., by replacing one drum having a re-coater blade set suitable for a first build process with another drum having re-coater blade set suitable for a second build process.

In accordance with certain embodiments the magazine 158 can include a chain-turret 180. The chain-turret 180 can be arranged to support a plurality of re-coater blades, e.g., two or more of the roller-type re-coater blade 152 and/or the brush-type re-coater blade 178. The chain-turret 180 provides the capability to service the re-coater 108 and the blade changer 112 simultaneously. Further, the chain-turret 180 allows the re-coater type to be swapped without breaching the inert atmosphere within build chamber 102 of the additive manufacturing system 100. As will be appreciated by those of skill in the art in view of the present disclosure, use of the drum 172 and/or the chain-turret 180 allows the blade changer 112 in proximity to the additive manufacturing system 100, limiting (or eliminating entirely) downtime associated with re-coater blade replacement and/or change-overs.

Figure 2:
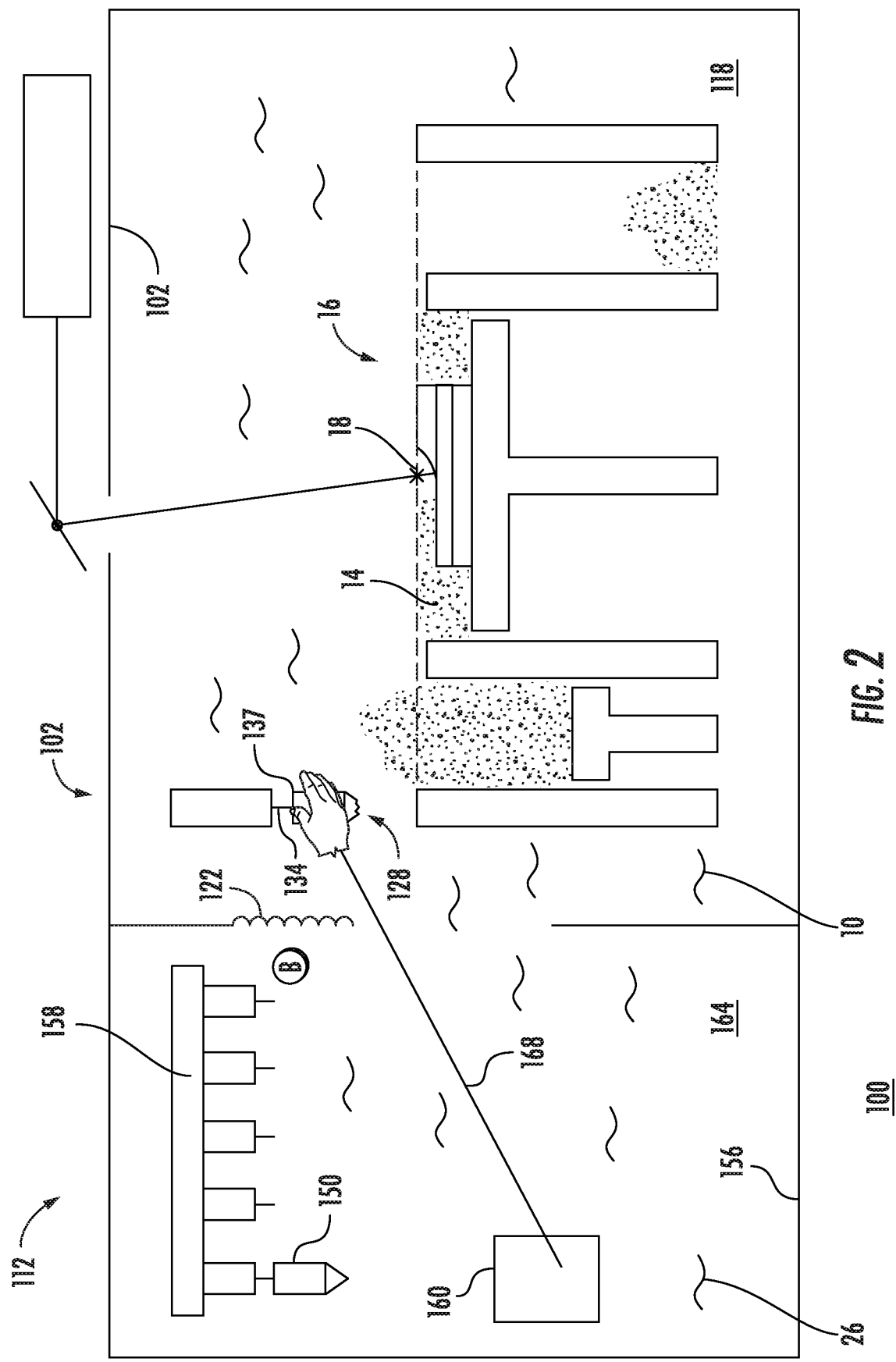
FIGS. 2-5 are schematic views of the additive manufacturing system of FIG. 1, showing the blade changer interchanging a worn or damaged deployed re-coater blade with a serviceable staged re-coater blade of the same type.

The manipulator 160 is arranged within the interior 164 of the housing 156 and has a reach 168 (shown in FIG. 2). The reach 168 of the manipulator 160 extends beyond the port 162. More specifically, the reach 168 of the manipulator 160 spans both the magazine 158 and the re-coater 108 for interchange of a re-coater blade supported by the magazine 158, e.g., the staged re-coater blade 150, with a re-coater blade deployed to the re-coater 108, e.g., the deployed re-coater blade 136. This limits (or eliminates entirely) downtime associated with manual re-coater blade change-over, increasing productivity the additive manufacturing system 100. In certain embodiments the deployed re-coater blade 136 can be interchanged with the staged re-coater blade 150 without breaching the atmosphere within the interior 118 of the build chamber 102. In accordance with certain embodiments the deployed re-coater blade 136 can be interchanged with the staged e-coater blade 150 without interrupting the fusing 18 of the powder 14 within the build chamber 102, limiting (or eliminating entirely) downtime due to manual changeover and/or productivity loss. It is contemplated that the manipulator 160 can include a robot (shown schematically as a box) with an end effector (illustrated as a hand) coupled by robotic arm and configured for gripping re-coater blades.

With reference to FIGS. 2-5, a re-coater blade replacement event is shown wherein blades of a common type, e.g. worn or damaged deployed re-coater blade 137 and the staged re-coater blade 150 (i.e., a serviceable staged re-coater blade), are interchanged with one another. As shown in FIG. 2, the replacement event begins with the shutter 122 moving from the closed position A (shown in FIG. 1) to the open position B. Movement of the shutter 122 to the open position B places the housing 156 of the blade changer 112 in communication with the interior 118 of the build chamber 102. The manipulator 160 then extends across the reach 168 of the manipulator 160, grasps the worn or damaged deployed re-coater blade 137, and removes the worn or damaged deployed re-coater blade 137 from the blade seat 134 of the re-coater 108.

Figure 3:
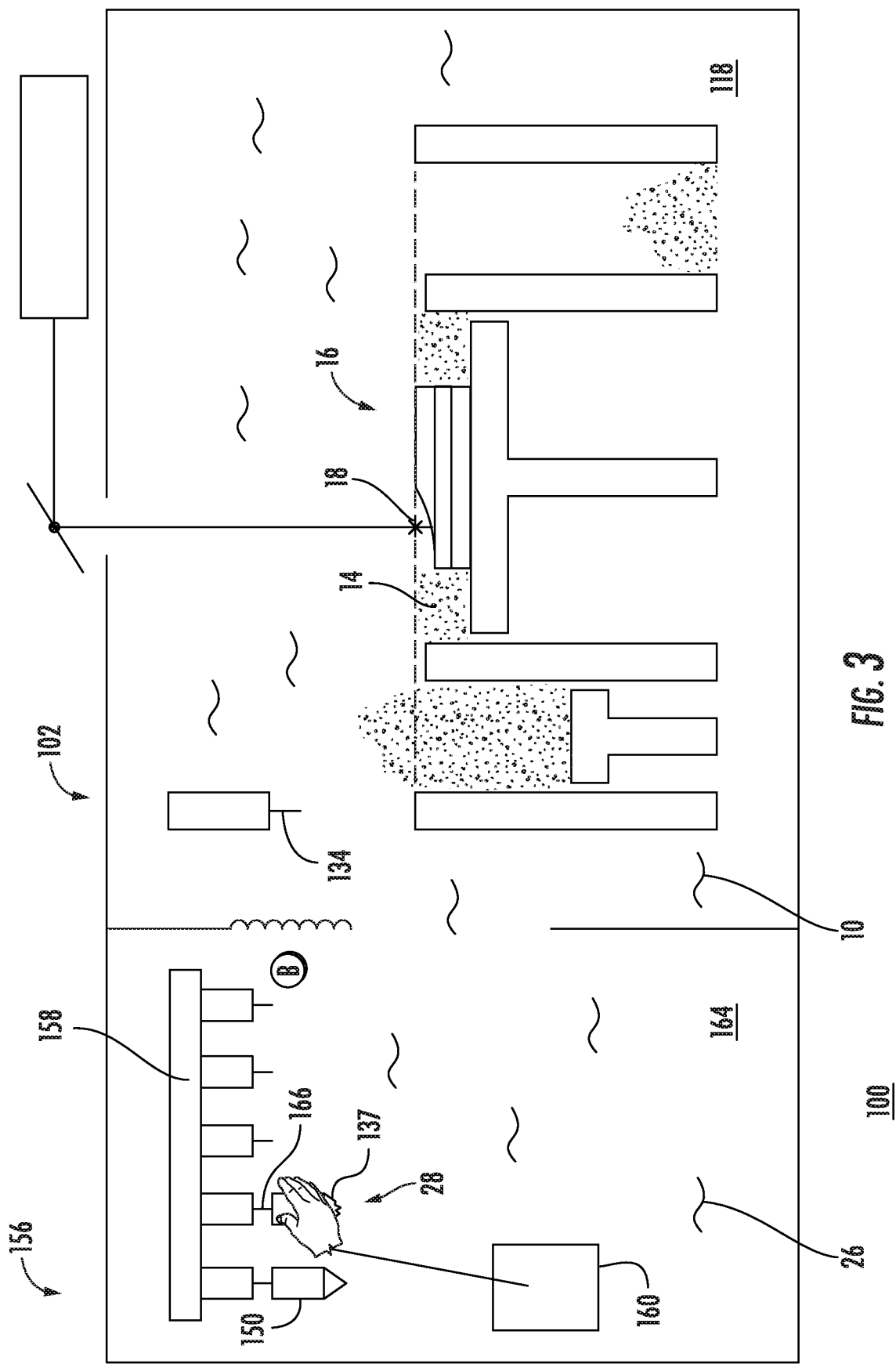
Figure 4:
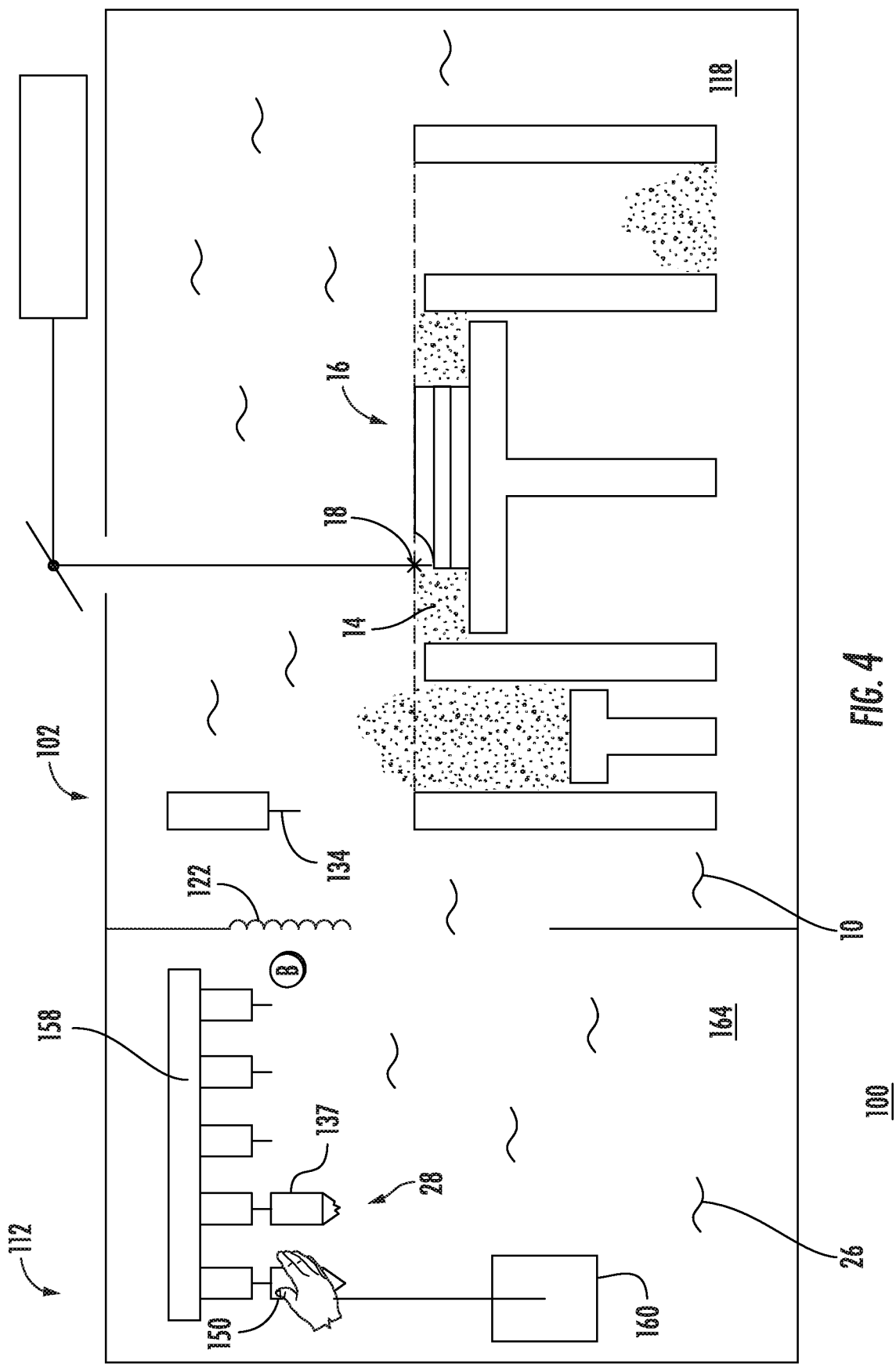
Figure 5:
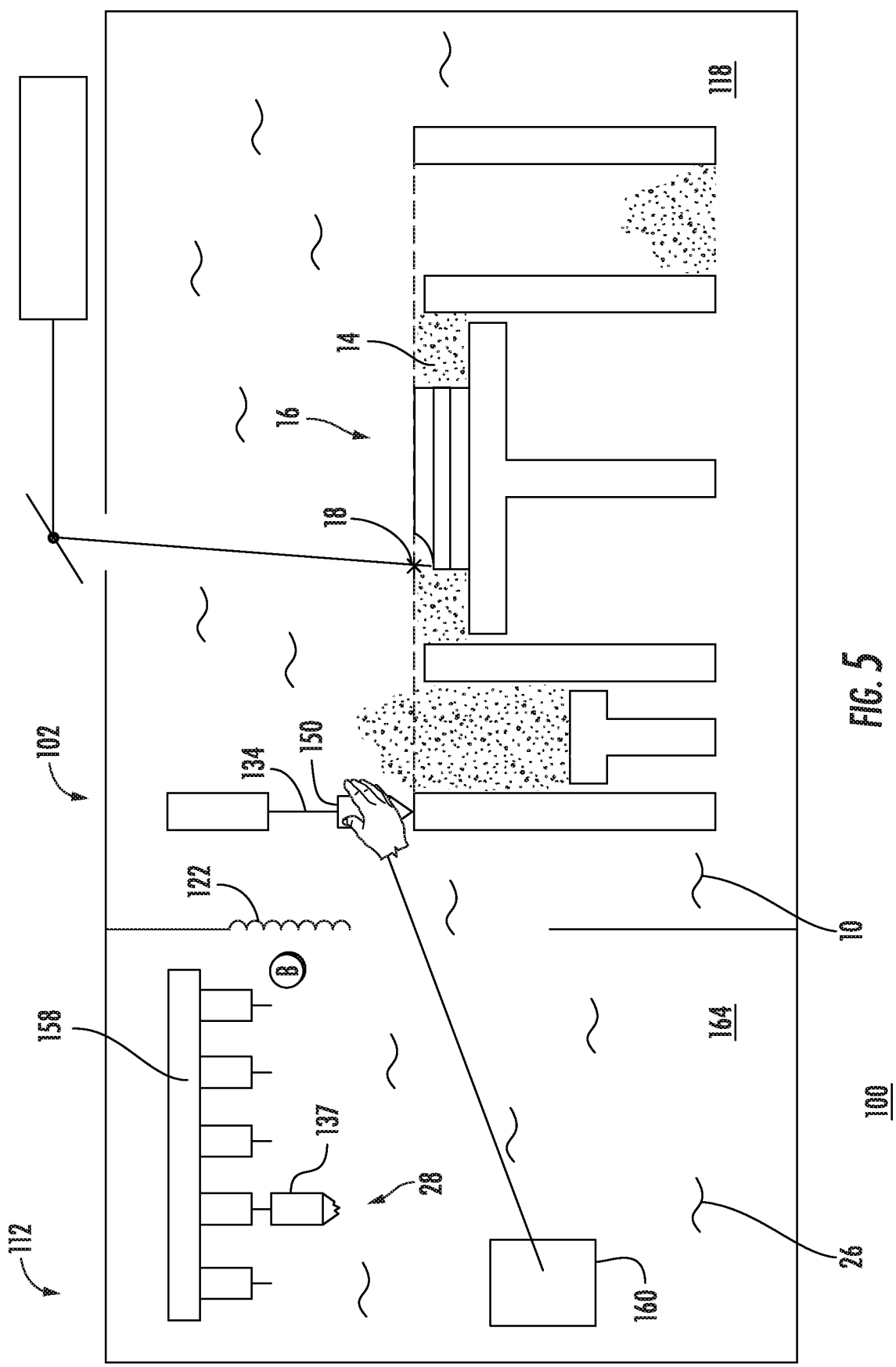

As shown in FIG. 3, the manipulator 160 thereafter retracts from the build chamber 102 and returns to the interior 164 of the housing 156. Once within the interior 164 of the housing 156, the manipulator 160 positions to the worn or damaged deployed re-coater blade 137 on a vacant re-coater blade support 166 of the magazine 158, the worn or damaged deployed re-coater blade 137 thereby being redeployed to the magazine 158. This frees the manipulator 160, allowing the manipulator 160 to grasp the serviceable staged re-coater blade 150, as shown in FIG. 4. The manipulator 160 then removes the serviceable staged re-coater blade 150 from the magazine 158, extends into the interior 118 of the build chamber 102, and positions the serviceable staged re-coater blade 150 on the blade seat 134 of the re-coater 108, as shown in FIG. 5, the serviceable staged re-coater blade 150 thereby being deployed to the re-coater 108. The re-coater 108 is thereafter ready to recoat the article 16 with additional powder 14.

The manipulator 160 is thereafter be retracted from the build chamber 102 through the pass-through 120 and port 162 of the build chamber 102 and the housing 156, respectively. Optionally, the shutter 122 can then be moved to the closed position A (shown in FIG. 1), the shutter 122 separating the interior 118 of the build chamber 102 from the interior 164 of the housing 156. Notably, as shown in FIGS. 2-5, the fusing 18 of the powder 14 can continue during the replacement of the worn or damaged deployed re-coater blade 137 with the serviceable staged re-coater blade 150, limiting (or eliminating entirely) the need to cease the build of the article 16 during the replacement event. Further, as the housing 156 and the build chamber 102 contain the chamber inert atmosphere 10 and the changer inert atmosphere 26, respectively, the environment during which the fusing 18 occurs can remain undisturbed during the replacement event. Although a specific type of deployed worn or damaged re-coater blade is shown undergoing replacement in FIGS. 2-5, it is to be understood and appreciated the blade changer 112 can be employed to replace other types of deployed re-coater blades, as suitable for a given application.

Figure 6:
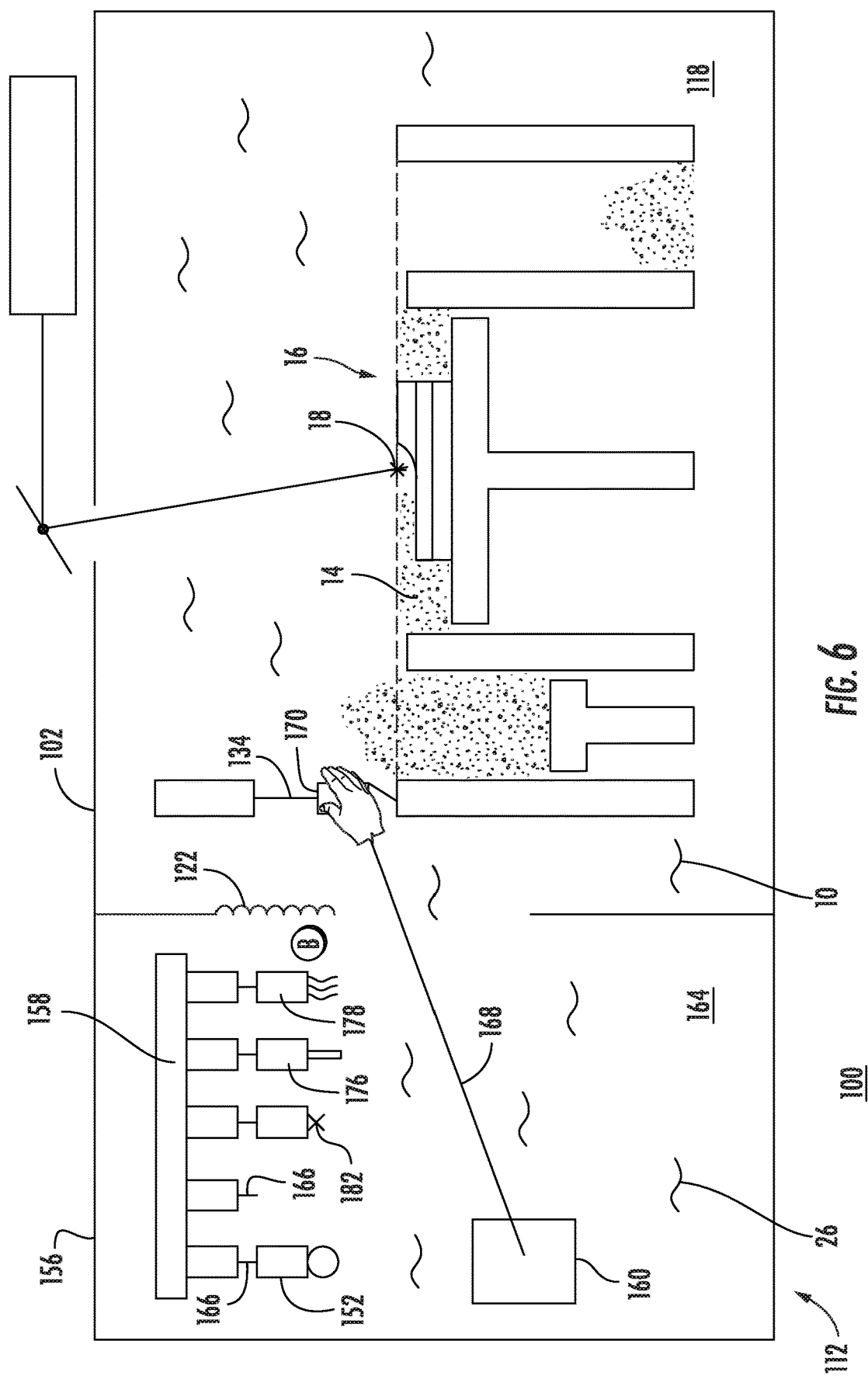
FIGS. 6-9 are schematic views of the additive manufacturing system of FIG. 1, showing the blade changer interchanging a deployed re-coater blade of one type with a staged re-coater blade of another type.

With reference to FIGS. 6-9, a re-coater blade changeover is shown wherein re-coater blades of different types, e.g., a deployed flexible-type re-coater blade 170 and a staged roller-type re-coater blade 152, are interchanged with one another. Reasons for changing over the re-coater blade include, for example, to employ a re-coater blade peculiar to the article undergoing build within the additive manufacturing system. As shown in FIG. 6, the changeover event begins with the shutter 122 moving from the closed position A (shown in FIG. 1) to the open position B. Movement of the shutter 122 to the open position B places the housing 156 of the blade changer 112 in communication with the interior 118 of the build chamber 102. The manipulator 160 then extends across the reach 168 of the manipulator 160, grasps the deployed flexible-type re-coater blade 170, and removes the deployed flexible-type re-coater blade 170 from the blade seat 134 of the re-coater 108.

Figure 7:
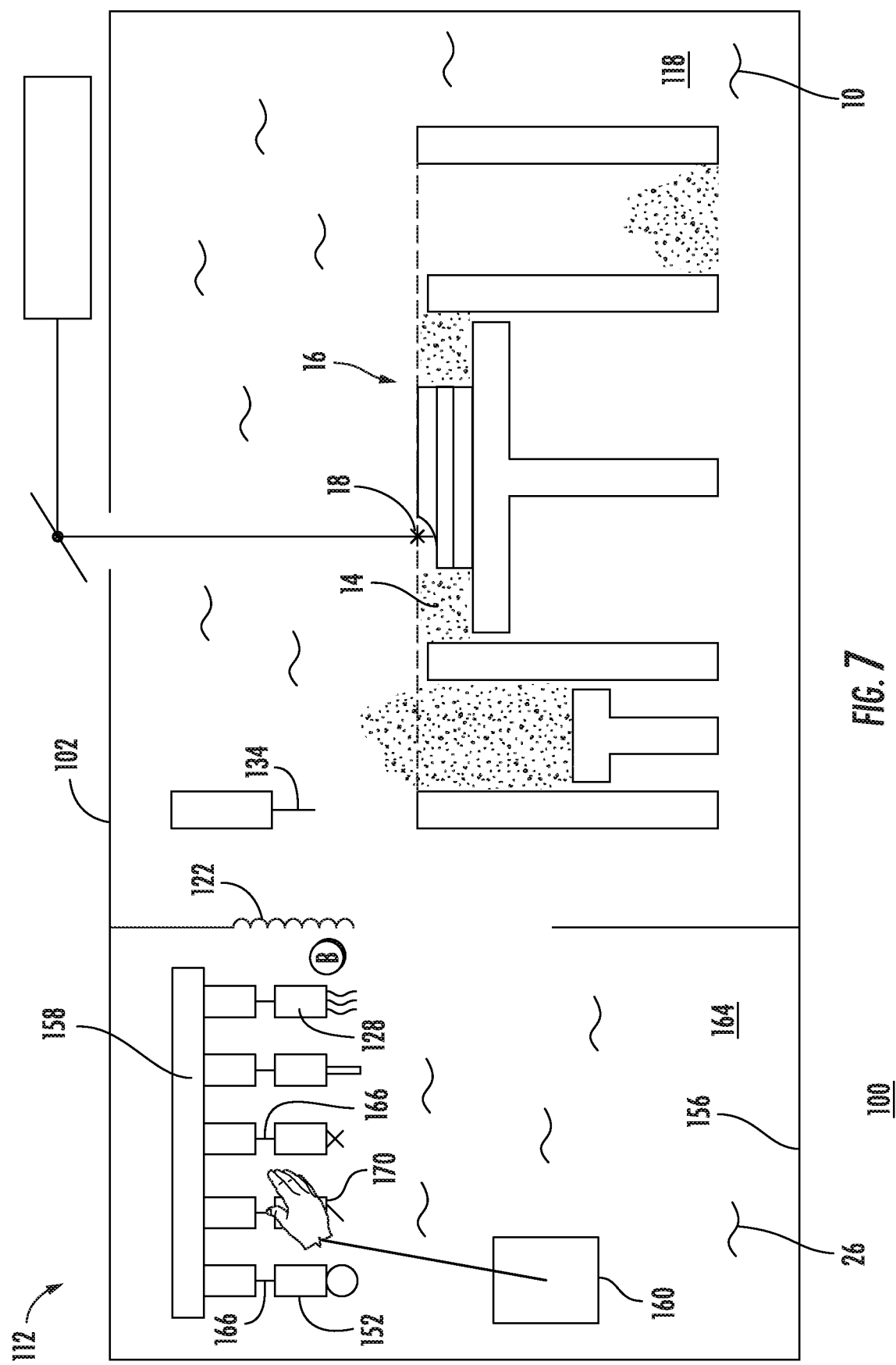
Figure 8:
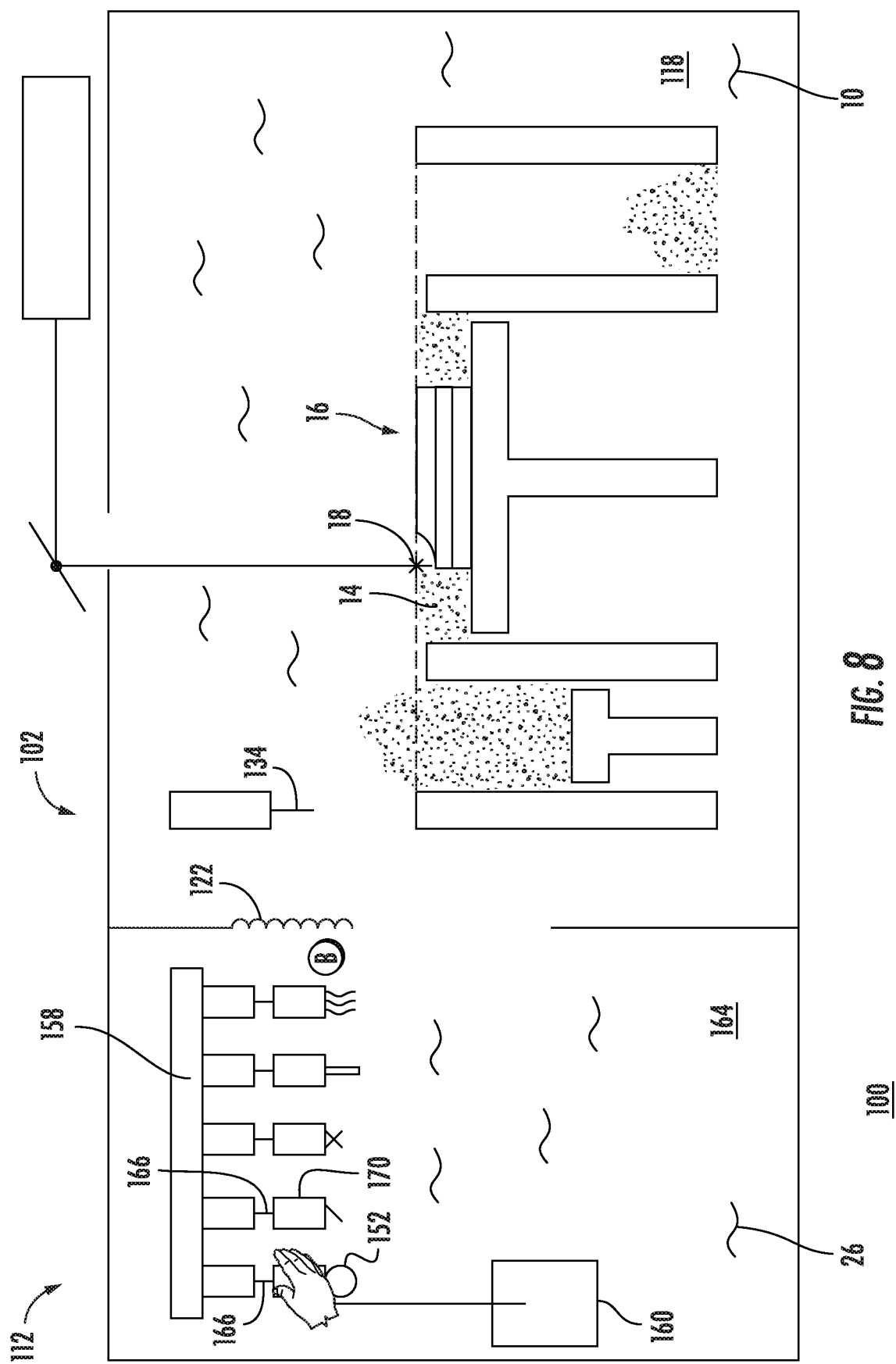
Figure 9:
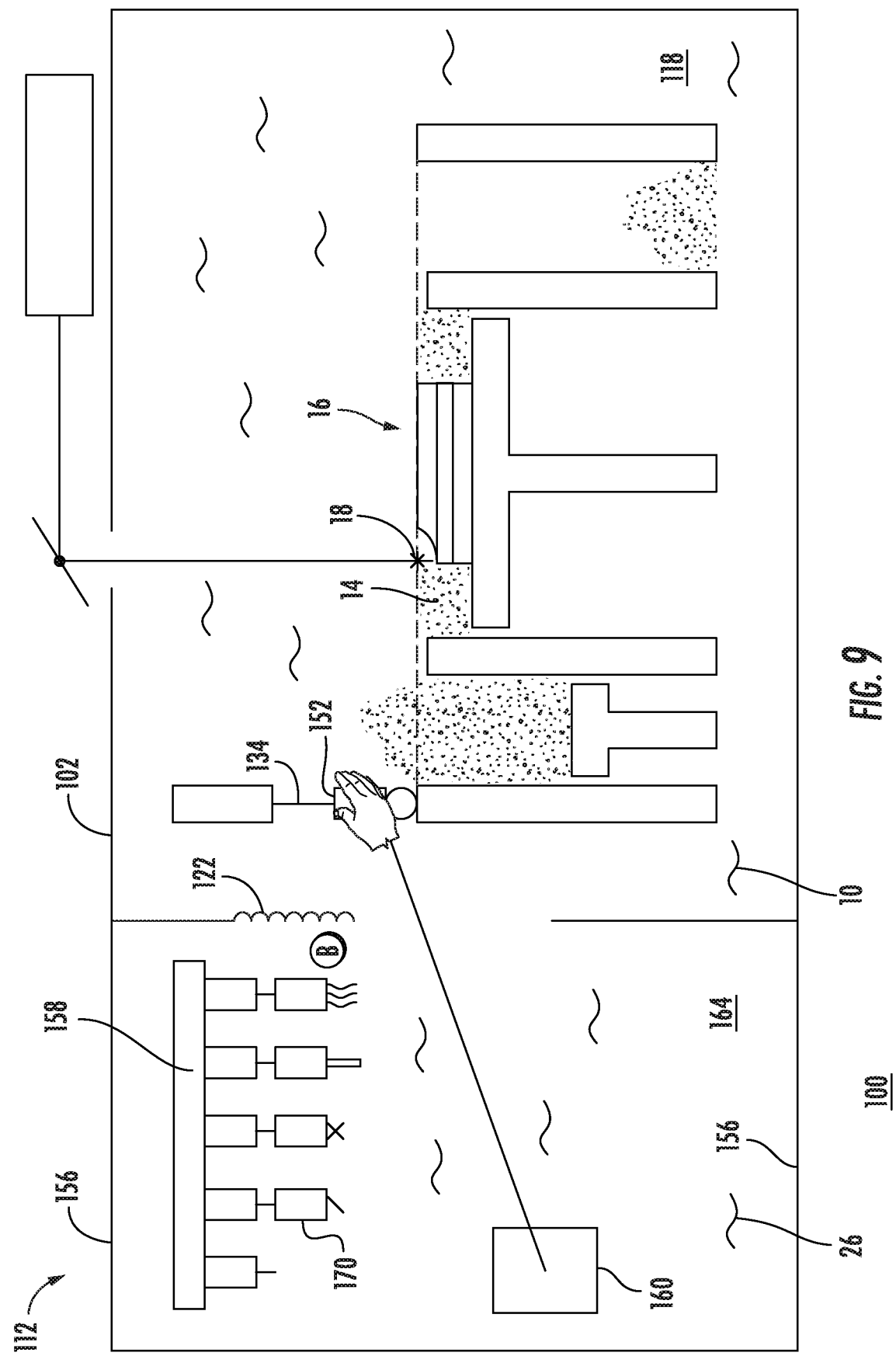

As shown in FIG. 7, the manipulator 160 thereafter retracts from the build chamber 102 and returns to the interior 164 of the housing 156. Once within the interior 164 of the housing 156 the manipulator 160 positions to the deployed flexible-type re-coater blade 170 on the re-coater blade support 166 of the magazine 158, the flexible-type re-coater blade 170 thereby being staged in the magazine 158. This frees the manipulator 160 and allows the manipulator 160 to grasp the staged roller-type re-coater blade 152, as shown in FIG. 8. The manipulator 160 then removes the staged roller-type re-coater blade 152 from the magazine 158, extends into the interior 118 of the build chamber 102, and positions the staged roller-type re-coater blade 152 on the blade seat 134 of the re-coater 108, as shown in FIG. 9, the roller-type re-coater blade 152 being deployed to the re-coater 108. The re-coater 108 is thereafter ready to recoat the article 16 with the powder 14 using the deployed roller-type re-coater blade 152.

The manipulator 160 is thereafter be retracted from the build chamber 102 through the pass-through 120 and port 162 of the build chamber 102 and the housing 156, respectively. Optionally, the shutter 122 can then be moved to the closed position A (shown in FIG. 1), the shutter 122 separating the interior 118 of the build chamber 102 from the interior 164 of the housing 156. Notably, as shown in FIGS. 6-9, the fusing 18 of the powder 14 can also continue during the interchange of the deployed flexible-type re-coater blade 170 and the staged roller-type re-coater blade 152, limiting (or eliminating entirely) the need to cease the build of the article 16 during the changeover event. Further, as the housing 156 and the build chamber 102 contain the chamber inert atmosphere 10 and the changer inert atmosphere 26, respectively, the environment during which the fusing 18 occurs can remains undisturbed during the changeover event. Although a particular type of changeover event is shown in FIGS. 6-9, e.g., changeover of a flexible-type re-coater blade 170 with a roller-type re-coater blade 152, it is to be understood and appreciated the blade changer 112 can be employed during changeover event involving other types of re-coater blades, e.g., the brush-type re-coater blade 190 (shown in FIG. 6) or the flexible-type re-coater blade 182 (shown in FIG. 6), as suitable for a given build process.

Figure 10:
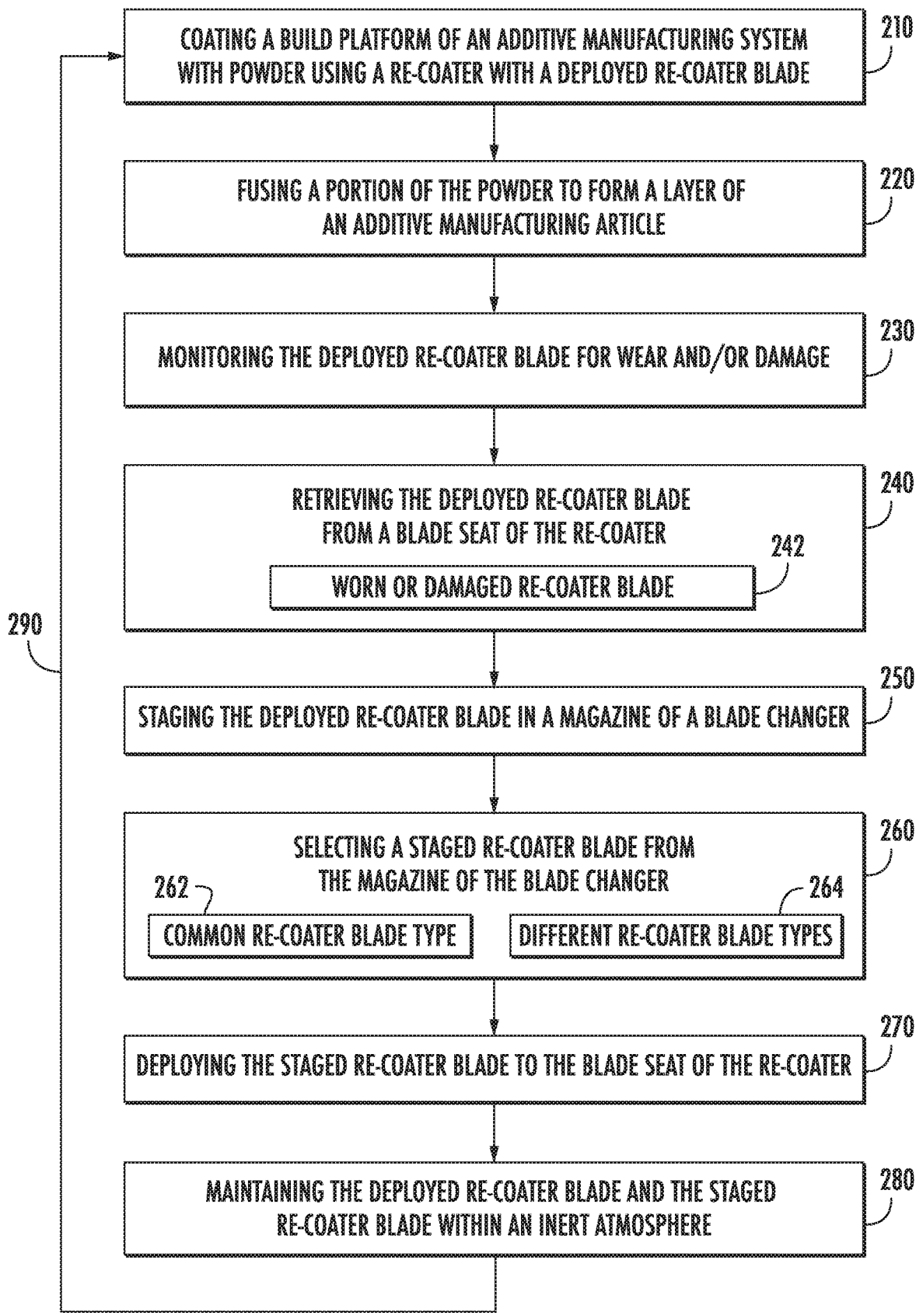
FIG. 10 is a diagram of a method interchanging a deployed re-coater blade with a staged re-coater blade according to an illustrative and non-limiting embodiment of the method.

With reference to FIG. 10, the method 200 of interchanging a deployed re-coater blade, e.g., the deployed re-coater blade 150 (shown in FIG. 1), with a staged re-coater blade, e.g., the staged re-coater blade 150 (shown in FIG. 1), is shown. As shown with box 210, the method 200 includes coating a build platform of an additive manufacturing system, e.g., the build platform 106 (shown in FIG. 1) of the additive manufacturing system 100 (shown in FIG. 1), with powder using a re-coater, e.g., the re-coater 108 (shown in FIG. 1), carrying the deployed re-coater blade. A portion of the coated powder is fused to form a layer of an additively manufactured article, e.g., the layer 20 (shown in FIG. 1) of the article 16 (shown in FIG. 1), as shown with box 220.

As shown with box 240, the method 200 additionally includes retrieving the deployed re-coater blade from a blade seat of the re-coater, e.g., the blade seat 134 (shown in FIG. 1). It is contemplated that the re-coater blade can be worn or damaged, e.g., having a worn or damaged portion 28 (shown in FIG. 2), as shown with box 232. The wear or damage can be recognized automatically, such as by monitoring the deployed re-coater blade with a sensor, e.g., the sensor 184 (shown in FIG. 1), as shown with box 230. It is also contemplated that the re-coater blade can be retrieved according to a routing of the article, e.g., such as by the structure of article requiring a fourth layer of the article requiring structure associated with a roller-type re-coater blade rather than a flexible-type re-coater blade.

As shown with box 25, the deployed re-coater blade is staged in a magazine of a blade changer, e.g., the magazine 158 (shown in FIG. 1) or the blade changer 112 (shown in FIG. 1). A blade is then selected from the magazine of the blade changer for deployment to the re-coater, as shown with box 250. In the event that wear or damage to the re-coater drives the need for the replacement of the re-coater blade, e.g., as recognized during operation 230, the re-coater blade is replaced with a re-coater blade of a common type, as shown with box 262. In the event that routing of the article drives the need for replacement of the re-coater blade a re-coater blade of a different type is selected, as shown with box 264.

The selected staged re-coater blade is then deployed to the re-coater module, as shown with box 270. Re-coating of the build platform and/or article and fusing thereafter continues using the deployed re-coater blade, as shown with arrow 290. In certain embodiments the recovery of the deployed re-coater blade and the deployment of the staged recovery blade are accomplished within an inert atmosphere, e.g., via placing the chamber inert atmosphere 10 (shown in FIG. 1) in communication with the changer inert atmosphere 26 (shown in FIG. 1), as shown with box 280. It is also contemplated that the build of the article can continue without interruption during the recovery of the deployed re-coater blade and the deployment of the staged re-coater blade.

In some additive manufacturing systems it can be necessary to periodically replace the re-coater blade carried by the re-coater. Reasons for replacement include wear and/or damage sustained during the build process as well as to alter the mechanical properties within the article being built in the additive manufacturing system. Replacement of the re-coater blade generally requires taking the additive manufacturing system out of service for a changeover and/or interrupting the build process to allow an operator manually replace the re-coater blade.

In embodiments described herein blade changers are provided for interchanging re-coater blades in additive manufacturing systems. In certain embodiments blade changers described herein can provide the capability to interchange the re-coater blade carried by re-coater with another re-coater blade of a common type, the blade changer thereby limiting (or eliminating entirely) the need to interrupt the build process and/or scrap the article in process to replace a worn or broken re-coater blade. In accordance with certain embodiments blade changers described herein can provide the capability to interchange the re-coater blade carried by re-coater with a re-coater blade of a different type, the blade changer thereby limiting (or eliminating entirely) the need to interrupt the build process to change the re-coater blade type during a manual changeover event.

Technical effects of the present disclosure include improved productivity through one or more of higher system availability, reduced re-work, and/or reduced scrap due to system interrupts and/or associated system atmosphere breach events. Technical effects also include the capability to vary the mechanical properties of the articles by varying powder coating characteristics and/or compositions interchanging re-coater coating members carried by the system re-coater device during build of an article. For example, it is contemplated that surface roughness and/or within-article density can be altered within the article by interchanging re-coater coating members carried by the system re-coater device with one or more re-coater coating member supported by the changer.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade changer for a re-coater, comprising:
   a housing located outside of a chamber containing the re-coater, the housing connected to the chamber via a port;
   a magazine supported within the housing; and
   a manipulator operably associated with the magazine and having a reach extending beyond the port to interchange re-coater blades between the magazine and an additive manufacturing system coupled to the port;
   wherein the manipulator is configured to selectably remove a re-coater blade from the magazine and reach through the port to install the re-coater blade at the re-coater.

2. The blade changer as recited in claim 1, wherein the magazine includes a plurality of blade supports fixed to the magazine.

3. The blade changer as recited in claim 1, further comprising a plurality of re-coater blades supported by the magazine.

4. The blade changer as recited in claim 2, wherein the plurality of re-coater blades includes a re-coater blade of a first type and a re-coater blade of a second type, wherein the second type is different than the first type.

5. The blade changer as recited in claim 2, wherein at least one of the re-coater blades is worn or damaged.

6. The blade changer as recited in claim 2, wherein the magazine has a drum, wherein the drum supports the plurality of re-coater blades.

7. The blade changer as recited in claim 2, wherein the magazine includes a chain-turret, wherein the chain-turret supports the plurality of re-coater blades.

8. The blade changer as recited in claim 1, wherein the manipulator is arranged within the housing.

9. The blade changer as recited in claim 1, further comprising a controller operably connected to the blade changer and responsive to instructions recorded on a non-transitory machine-readable medium to:
   retrieve a deployed re-coater blade from a blade seat of a re-coater;
   stage the deployed re-coater blade in the magazine;
   select a staged re-coater blade from the magazine; and
   deploy the staged re-coater blade to the blade seat of the re-coater.

10. An additive manufacturing system, comprising:
    a build chamber having an interior and a pass-through;
    a blade changer as recited in claim 1, wherein the housing is coupled to the build chamber such that the pass-through is in communication with the port; and
    a re-coater arranged within the housing, wherein the reach of the manipulator extends between the magazine and the re-coater for interchange of a re-coater blade carried by the re-coater and a re-coater blade supported by the magazine.

11. The additive manufacturing system of claim 10, wherein the magazine includes a plurality of blade supports fixed to the magazine, and wherein the manipulator is arranged within the housing.

12. The additive manufacturing system as recited in claim 10, further comprising an energy source with an emitter and a scanner, the energy source coupled to the scanner, the scanner coupled to an interior of the build chamber.

13. The additive manufacturing system as recited in claim 10, further comprising:
    a build platform arranged within the interior of the build chamber; and
    an article having a plurality of layers formed from inter-fused powder, the article supported by the build platform.

14. The additive manufacturing system as recited in claim 10, further comprising a shutter disposed within the pass-through.

15. The additive manufacturing system as recited in claim 14, wherein the shutter has an open position and a closed position, the interior of the build chamber in communication with the housing in the open position, the interior of the build chamber separated from the housing in the closed position.

16. The additive manufacturing system as recited in claim 14, wherein the interior of the build chamber has a chamber inert atmosphere, wherein the housing contains a changer inert atmosphere, wherein the system further comprises a wear sensor in communication with the re-coater for monitoring wear and/or damage of the re-coater blade.

* * * * *